April 19, 1949.   CARL-GEORG P. AURELL   2,467,455
RADIO SPEED AND DISTANCE INDICATOR Filed May 11, 1944

Inventor
C.-G. P. Aurell
By Glascock Downing & Seebold
Attys

Patented Apr. 19, 1949

2,467,455

UNITED STATES PATENT OFFICE 2,467,455

RADIO SPEED AND DISTANCE INDICATOR

Carl-Georg Paul Aurell, Stockholm, Sweden, assignor to Telefonaktiebolaget L M Ericsson, Stockholm, Sweden, a company of Sweden Application May 11, 1944, Serial No. 535,135
In Sweden May 17, 1943

2 Claims. (Cl. 343—9)

This invention relates to a device which by means of radio waves measures the speed of the device relative to another object and the distance between this object and said device.

Figure 1:
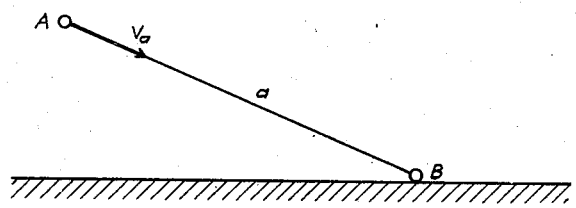
Figure 2:
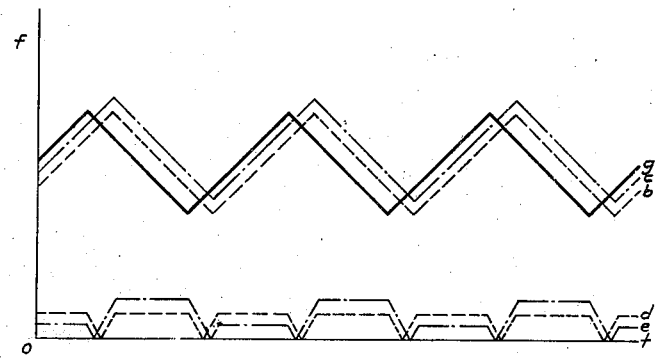

The invention will be more particularly described with reference to the accompanying drawing, Fig. 1 of which illustrates schematically a situation where the invention is practiced, Fig. 2 shows the variation of the frequency with the time and Fig. 3 an example of a connection according to the invention.

Assuming that A in Fig. 1 is an aircraft and B an object on the ground or on the water, for example a battleship, the problem is to measure the distance $a$ between A and B and the relative speed $v_a$ between A and B along the connecting line. The measuring takes place with the aid of short radio waves emitted from a transmitter which is located in A and reflected by the object B, whereupon the reflected waves return to A, there to be received in a receiver. As is the case with known arrangements of this kind for measuring the distance (compare for example Bell System Technical Journal, volume 18, 1939, page 222) the frequency of the transmitter varies as illustrated by the unbroken curve line $g$ in Fig. 2. The frequency of the reflected and by A again received radio waves varies with the broken curve line $b$. The displacement between curves $g$ and $b$ in the horizontal plane is caused by the time of propagation from A to B and back. The instantaneous value of the difference between the emitted and received frequency is thus directly porportional to the distance $a$. This difference is traced by a broken curve line $d$.

In order to measure the relative velocity the Doppler principle is embodied in the invention on the radio waves emitted and received. As the length of the course taken by the waves between transmitter, reflecting object and receiver waries with the time on account of the distance $a$ being altered, the frequency of the wave returning to the receiver will be altered in relation to the emitted wave, even if the latter be constant. If transmitter and receiver are placed together and if the relative velocity be $v_a$ as previously, the difference becomes $$\frac{2v_a}{\lambda}$$

where $\lambda$ is the wave length of the frequency employed. The curve $c$ which shows the course of the received frequency will therefore be displaced in parallel in the vertical plane in relation to curve $b$, said curve showing the course of the received frequency in case of the velocity $v_a$ being zero. Should the objects A and B, as shown in Fig. 1, approach each other, the frequency will be increased, the frequency curve thereby being displaced upwardly as illustrated by the dashed curve line $c$ in Fig. 2. If the frequency difference between emitted and received waves be drawn up, a curve is received of the difference frequency in conformity with the dashed curve line $e$ in Fig. 2. As will be seen, the frequency varies principally between two constant values. The notches in curve $c$ caused by the upper and lower points of the saw-toothed curves $g$ and $c$ have no importance as they in practice require but a brief instant of time.

Figure 3:
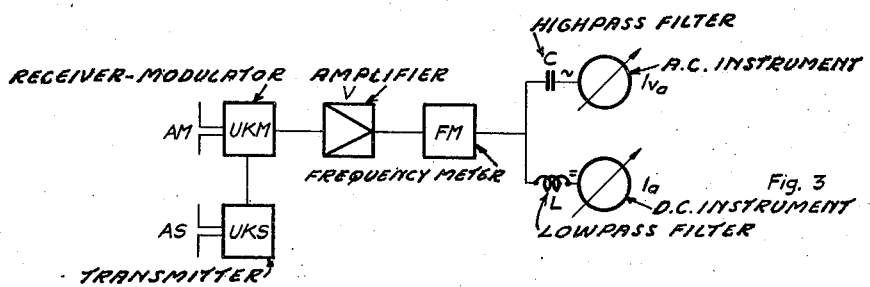

The schematic sketch in Fig. 3 illustrates a device for measuring of distance and speed by means of radio waves based on the principle described above. It consists of a transmitter UKS for ultra-short waves and a receiver UKM for the reflected waves. Both transmitter and receiver are provided with antennas AS and AM respectively, which preferably are arranged for transmission and reception in a certain direction, whereby the transmitting and receiving effect is directed against the object B in Fig. 1. The signals emitted from UKS are received on two paths by the receiver UKM, partly over a direct path between the antennas AS and AM (or possibly within the device), partly over the object to which distance and relative velocity are to be measured. The two frequencies, for example $g$ and $c$ in Fig. 2, are thus united in UKM, where the difference frequency according to curve $e$ in Fig. 2 is formed by modulation between the two frequencies. The difference frequency is amplified in an amplifier V and measured in a frequency meter FM. The result hereof is a pulsating direct current. The direct current value thereby represents, as is seen from Fig. 2, the distance $a$ between A and B and the alternating current of the pulsations represents the velocity $v_a$. In the arrangement according to Fig. 3 the pulsating direct current is divided into a direct and an alternating current. The former passes over a low pass filter, represented by a coil L, and continues to a direct current instrument $I_a$, which indicates the distance. The alternating current passes over a high pass filter, represented by a condenser C, to an alternating current instrument $I_{va}$, which indicates a value of the velocity $v_a$.

If exclusively the relative velocity $v_a$ is to be measured or an indication is wanted for an object moving in relation to A in the vicinity, it is naturally not necessary to emit a varying frequency $g$, since in this case only the frequency alteration caused by the Doppler effect need be measured.

I claim:

1. The method of measuring speed and distance with respect to a reflecting object, including the steps of transmitting a frequency modulated signal to said object, receiving said signal after reflection, combining said received signal with said transmitted signal to produce a beat signal, deriving from said beat signal a voltage substantially proportional in instantaneous magnitude to the frequency of said beat signal, measuring the amplitude of the A.-C. component of said voltage, and measuring the magnitude of the D.-C. component of said voltage.

2. Device for measuring of the distance and speed of a first object in relation to a second object, comprising a transmitter on the first object for emitting radio waves with periodically varying frequency, a receiver on said first object and means for combining the waves reflected from the second object and received in said receiver with radio waves transmitted directly from transmitter to receiver to produce a beat signal, the output circuit of said means containing two parallel branches, one branch including a direct current suppress filter and an alternating current instrument, the other branch including an alternating current suppress filter and a direct current instrument.

CARL-GEORG PAUL AURELL.

REFERENCES CITED

The following references are of record in the file of this patent:

UNITED STATES PATENTS

| Number | Name | Date |
|---|---|---|
| 2,268,587 | Guanella | Jan. 6, 1942 |